United States Patent
Husband et al.

(10) Patent No.: US 11,920,492 B1
(45) Date of Patent: Mar. 5, 2024

(54) ASYMMETRIC SPACER TO IMPROVE FLANGE STRENGTH

(71) Applicant: Raytheon Technologies Corporation, Farmington, CT (US)

(72) Inventors: Jason B. Husband, South Glastonbury, CT (US); Michael D. Greenberg, Bloomfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/123,877

(22) Filed: Mar. 20, 2023

(51) Int. Cl.
*F01D 25/24* (2006.01)

(52) U.S. Cl.
CPC ........ *F01D 25/243* (2013.01); *F05D 2260/31* (2013.01)

(58) Field of Classification Search
CPC ............................ F01D 25/243; F05D 2260/31
See application file for complete search history.

(56) References Cited

U.S. PATENT DOCUMENTS

| | | | |
|---|---|---|---|
| 5,230,540 A | 7/1993 | Lewis et al. | |
| 5,263,997 A * | 11/1993 | Parker | F01D 25/243 415/214.1 |
| 6,176,663 B1 * | 1/2001 | Nguyen | F16L 23/036 411/537 |
| 6,467,988 B1 * | 10/2002 | Czachor | F01D 25/243 403/337 |
| 7,056,053 B2 * | 6/2006 | Schilling | F16B 43/02 411/537 |
| 9,169,728 B2 * | 10/2015 | Wallace | F01D 25/04 |
| 10,247,038 B2 | 4/2019 | Kappes et al. | |
| 2003/0118399 A1 * | 6/2003 | Schilling | F01D 25/243 403/337 |
| 2007/0086854 A1 * | 4/2007 | Blanton | B29C 65/562 415/232 |
| 2012/0219358 A1 * | 8/2012 | Reed | F01D 25/246 403/337 |
| 2012/0328365 A1 * | 12/2012 | Care | F01D 21/045 403/337 |
| 2019/0072001 A1 * | 3/2019 | Weisbrod | F01D 25/243 |
| 2019/0107007 A1 * | 4/2019 | Yashirodai | G06F 30/23 |
| 2019/0162077 A1 * | 5/2019 | Ghosh | F01D 21/08 |
| 2019/0376417 A1 * | 12/2019 | Mizunoue | F04D 29/406 |
| 2023/0193945 A1 * | 6/2023 | Heeter | F16B 33/00 411/367 |

* cited by examiner

*Primary Examiner* — David E Sosnowski
*Assistant Examiner* — Aye S Htay
(74) *Attorney, Agent, or Firm* — SNELL & WILMER L.L.P.

(57) ABSTRACT

A mounting assembly is provided. The mounting assembly includes a first flange; a second flange; a first asymmetric spacer; a second asymmetric spacer; and a bolt configured to pass through a void of the first asymmetric spacer starting at a first end, through at least one first opening of the first flange, through at least one second opening of the second flange, through a void of the second asymmetric spacer starting at a second end, and to be coupled to a nut, such that, in response to the nut being fastened to the bolt, the bolt bends due to a non-vertical slope of the first asymmetric spacer and a non-vertical slope of the second asymmetric spacer.

18 Claims, 9 Drawing Sheets

ASYMMETRIC SPACER TO IMPROVE FLANGE STRENGTH

FIELD

The present disclosure relates generally to gas turbine engines and, more particularly, to an asymmetric spacer to improve flange strength between components of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases to power the compressor and fan sections. A gas turbine engine should be capable of ingesting foreign objects (e.g., birds in flight) while allowing for continued operation or safe and orderly shutdown of the engine. However, in some instances, fan blade loss may occur, which may cause a rotating imbalance within the gas turbine engine.

SUMMARY

A mounting assembly is disclosed herein for coupling a first case section of a gas turbine engine to a second case section of the gas turbine engine, the first case section and the second case section extending along an axial direction with respect to a central rotational axis of the gas turbine engine. The mounting assembly includes a first flange coupled to the first case section; a second flange coupled to the second case section; a first asymmetric spacer comprising a first end with a non-vertical slope, a second end with a vertical slope, and a void passing through a length of the first asymmetric spacer from the first end to the second end; a second asymmetric spacer comprising a first end with a non-vertical slope, a second end with a vertical slope, and a void passing through a length of the second asymmetric spacer from the first end to the second end; and a bolt configured to pass through the void of the first asymmetric spacer starting at the first end, through at least one first opening of the first flange, through at least one second opening of the second flange, through the void of the second asymmetric spacer starting at the second end, and to be coupled to a nut, such that, in response to the nut being fastened to the bolt, the bolt bends due to the non-vertical slope of the first asymmetric spacer and the non-vertical slope of the second asymmetric spacer.

In various embodiments, a longest length of the first asymmetric spacer is configured to be oriented at a furthest distance from a first axial center of the first case section, and wherein a longest length of the second asymmetric spacer is configured to be oriented at a furthest distance from a second axial center of the second case section. In various embodiments, a center of a bend of the bolt remains at an axial center of the bolt, wherein a first end of the bolt bends away from the axial center of the bolt toward the axial center of the first case section, and wherein a second end of the bolt bends away from the axial center of the bolt toward the axial center of the second case section. In various embodiments, the non-vertical slope of the first asymmetric spacer and the second asymmetric spacer is between 0.2 and 5 degrees.

In various embodiments, the first asymmetric spacer and the second asymmetric spacer are divided into quadrants along a width of the first asymmetric spacer and the second asymmetric spacer and wherein each of the quadrants have a different material strengths. In various embodiments, a first material strength of a first quadrant along a longest length of the first asymmetric spacer and the second asymmetric spacer has greater rigidity than a second material strength of a second quadrant adjacent to the first quadrant, wherein the second material strength has greater rigidity than a third material strength of a third quadrant adjacent to the second quadrant, and wherein the third material strength has greater rigidity than a fourth material strength of a fourth quadrant adjacent to the third quadrant. In various embodiments, the different material strengths are formed by at least one of heat treating, three-dimension printing, machining, drilling, or electrical discharge machining (EDM).

In various embodiments, the first asymmetric spacer comprises a first flange hook configured to hook to an outer edge of the first flange thereby aligning a longest length of the first asymmetric spacer at a furthest distance from a first axial center of the first case section, and wherein the second asymmetric spacer comprises a second flange hook configured to hook to an outer edge of the second flange thereby aligning a longest length of the second asymmetric spacer at a furthest distance from a second axial center of the second case section. In various embodiments, the first asymmetric spacer comprises a first bridge mechanism coupled to a first adjacent asymmetric spacer, wherein the first bridge mechanism is configured to align a longest length of the first asymmetric spacer at a furthest distance from a first axial center of the first case section, and wherein the second asymmetric spacer comprises a second bridge mechanism coupled to a second adjacent asymmetric spacer, wherein the second bridge mechanism is configured to align a longest length of the second asymmetric spacer at a furthest distance from a second axial center of the second case section. In various embodiments, the first asymmetric spacer and the second asymmetric spacer are manufactured from alloys of aluminum, nickel, titanium, or stainless steel.

Also disclosed herein is a gas turbine engine. The gas turbine engine includes a first asymmetric spacer comprising a first end with a non-vertical slope, a second end with a vertical slope, and a void passing through a length of the first asymmetric spacer from the first end to the second end; a second asymmetric spacer comprising a first end with a non-vertical slope, a second end with a vertical slope, and a void passing through a length of the second asymmetric spacer from the first end to the second end; and a bolt configured to pass through the void of the first asymmetric spacer starting at the first end, through at least one first opening of a first flange, through at least one second opening of a second flange, through the void of the second asymmetric spacer starting at the second end, and to be coupled to a nut, such that, in response to the nut being fastened to the bolt, the bolt bends due to the non-vertical slope of the first asymmetric spacer and the non-vertical slope of the second asymmetric spacer.

In various embodiments, the first flange is coupled to a first case section, wherein the second flange is coupled to a second case section, wherein a longest length of the first asymmetric spacer is configured to be oriented at a furthest distance from a first axial center of the first case section, and wherein a longest length of the second asymmetric spacer is configured to be oriented at a furthest distance from a second axial center of the second case section. In various embodiments, a center of a bend of the bolt remains at an axial center of the bolt, wherein a first end of the bolt bends away from the axial center of the bolt toward the axial center of a first case section, and wherein a second end of the bolt bends away from the axial center of the bolt toward the axial center of a second case section. In various embodiments, the non-vertical slope of the first asymmetric spacer and the second asymmetric spacer is between 0.2 and 5 degrees.

In various embodiments, the first asymmetric spacer and the second asymmetric spacer are divided into quadrants along a width of the first asymmetric spacer and the second asymmetric spacer and wherein each of the quadrants have a different material strengths. In various embodiments, a first material strength of a first quadrant along a longest length of the first asymmetric spacer and the second asymmetric spacer has greater rigidity than a second material strength of a second quadrant adjacent to the first quadrant, wherein the second material strength has greater rigidity than a third material strength of a third quadrant adjacent to the second quadrant, and wherein the third material strength has greater rigidity than a fourth material strength of a fourth quadrant adjacent to the third quadrant. In various embodiments, the different material strengths are formed by at least one of heat treating, three-dimension printing, machining, drilling, or electrical discharge machining (EDM).

In various embodiments, the first asymmetric spacer comprises a first flange hook configured to hook to an outer edge of the first flange thereby aligning a longest length of the first asymmetric spacer at a furthest distance from a first axial center of a first case section, and wherein the second asymmetric spacer comprises a second flange hook configured to hook to an outer edge of the second flange thereby aligning a longest length of the second asymmetric spacer at a furthest distance from a second axial center of a second case section. In various embodiments, the first asymmetric spacer comprises a first bridge mechanism coupled to a first adjacent asymmetric spacer, wherein the first bridge mechanism is configured to align a longest length of the first asymmetric spacer at a furthest distance from a first axial center of a first case section, and wherein the second asymmetric spacer comprises a second bridge mechanism coupled to a second adjacent asymmetric spacer, wherein the second bridge mechanism is configured to align a longest length of the second asymmetric spacer at a furthest distance from a second axial center of a second case section. In various embodiments, the first asymmetric spacer and the second asymmetric spacer are manufactured from alloys of aluminum, nickel, titanium, or stainless steel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is an asymmetric spacer to improve flange strength between components of gas turbine engines. Gas turbine engines, such as those that power modern aircraft, should be capable of ingesting foreign objects (e.g., birds in flight) while allowing for continued operation or safe and orderly shutdown of the engine. However, in some instances, fan blade loss may occur, which may cause a rotating imbalance within the gas turbine engine. During fan blade loss, the rotating imbalance of a rotor generates engine backbone bending which challenges bolted joints at case flanges. This flange backbone bending generates an axial load that repeatedly pushes the flange joint together and pulls the flange joint apart. In various embodiments, a bolt/nut mechanism utilized to bolt joints at case flanges and the case sections including the flanges themselves are not aligned axially between the axial center of the bolt/nut mechanism and the axial center of the case sections including the flanges creates a local bending moment on a bolt of the bolt/nut mechanism, typically causing the bolt to fail. A failed bolt may lead to the flange 'unzipping', i.e. subsequent bolt failures around the flange joint, during the rotating imbalance. Accordingly, in various embodiments, an asymmetric spacer is utilized to improve flange strength between components of gas turbine engines. In various embodiments, the asymmetric bolt spacer is designed to tend to minimize harmful effects of flange bending. In various embodiments, the harmful effects are tended to be minimized by an initial negative bend in the bolts utilized to bolt joints at case flanges which is provided by the asymmetric spacer. In various embodiments, the harmful effects are tended to be minimized by a yield in the asymmetric spacer. In various embodiments, the asymmetric spacer includes quadrants having various material strengths, varying from one quadrant that yields pliably to another quadrant that yields rigidly.

Figure 1:
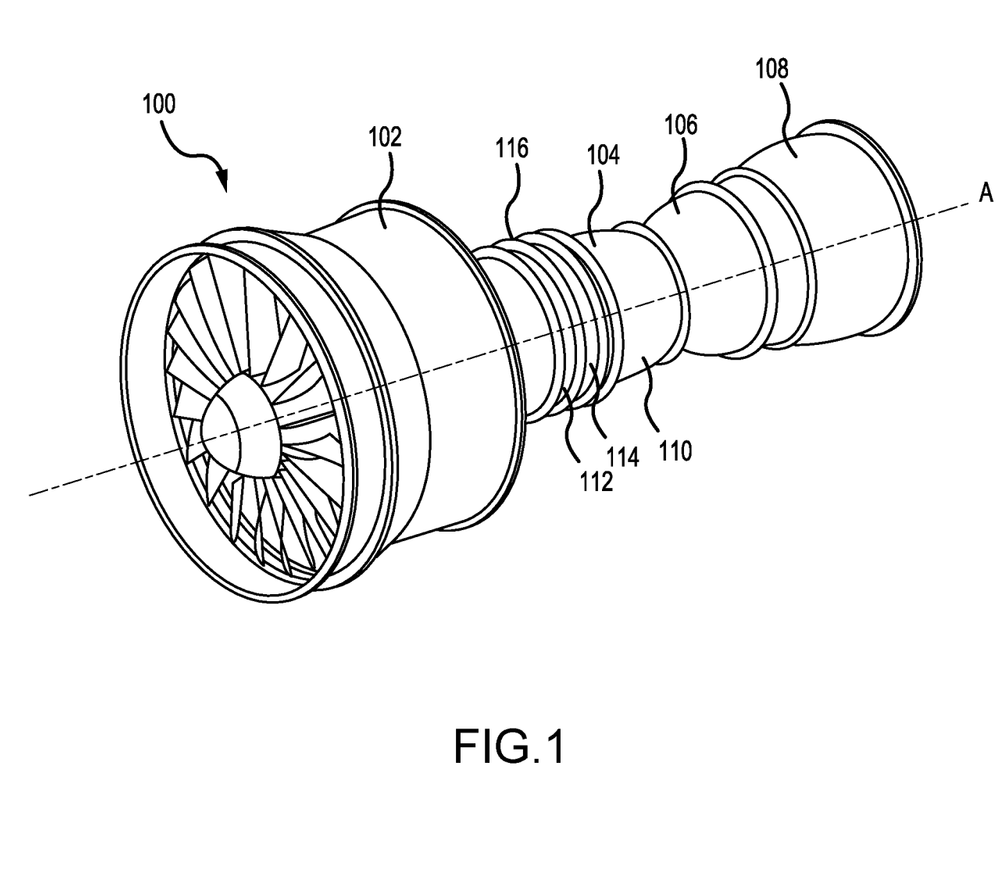
FIG. 1 schematically illustrates a gas turbine engine, in accordance with various embodiments.

Referring now to the drawings, FIG. 1 schematically illustrates a gas turbine engine 100, in accordance with various embodiments. The gas turbine engine 100 includes a fan section 102, a compressor section 104, a combustor section 106, and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flange locations, such as, for example, flange intersection 116.

Figure 2A:
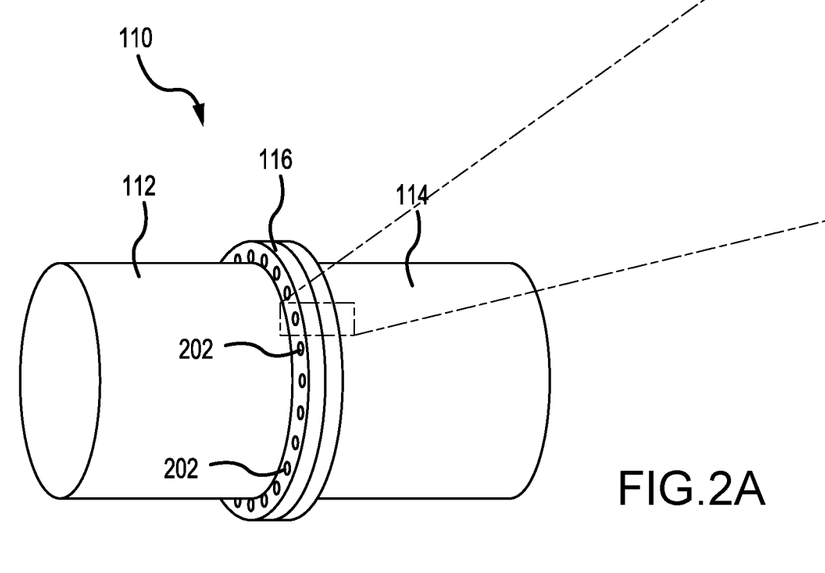
FIGS. 2A and 2B illustrate a schematic view of two sections of an engine case joined together at bolted flange locations, in accordance with various embodiments.
Figure 2B:
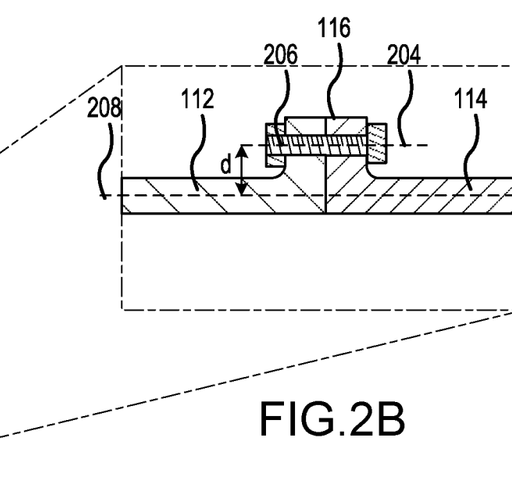

Referring now to FIGS. 2A and 2B, a schematic view of two sections of an engine case 110 joined together at bolted flange locations is illustrated, in accordance with various embodiments. In various embodiments, the engine case 110 is constructed of individual case sections, such as a first case section 112 and a second case section 114, bolted together at flange intersection 116 at various locations 202 around the flange intersection 116. In FIG. 2B, a cross section of a bolted flange location between the first case section 112 and the second case section 114 at the flange intersection 116 illustrates that an axial center 204 of bolt/nut mechanism 206 is offset at a distance from the axial center 208 of the first case section 112 and the second case section 114 which form the flange intersection 116.

Figure 3A:
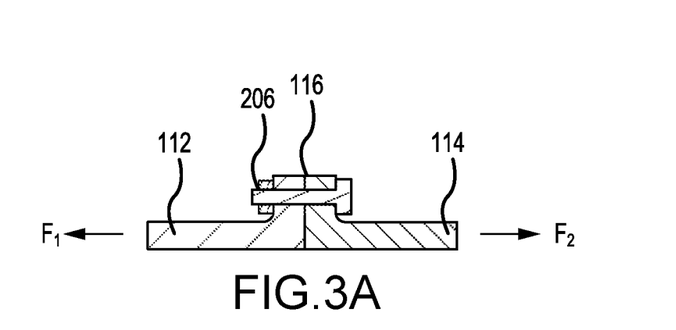
FIGS. 3A, 3B, and 3C illustrate schematic views of a cross section of a bolted flange location between a first case section and a second case section at the flange intersection subject to two opposite forces, in accordance with various embodiments.
Figure 3B:
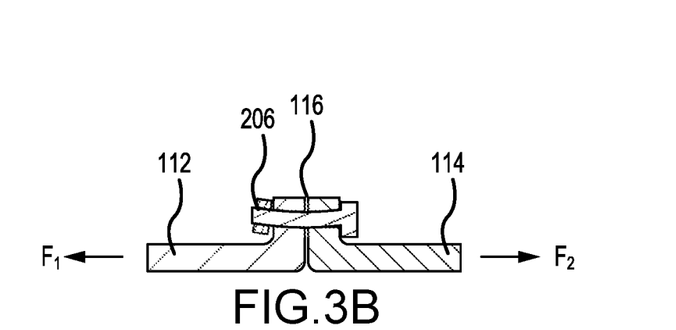
Figure 3C:
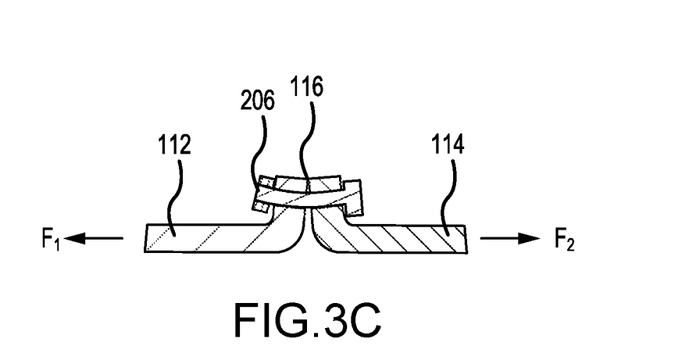

Referring now to FIGS. 3A, 3B, and 3C, schematic views of a cross section of a bolted flange location between the first case section 112 and the second case section 114 at the flange intersection 116 subject to two opposite forces is illustrated, in accordance with various embodiments. In various embodiments, when an event occurs, such as a fan blade loss within a gas turbine engine, as illustrated in FIG. 3A, a rotating imbalance may occur within a gas turbine engine that may cause a first force $F_1$ and a second force $F_2$ opposite the first force $F_1$ to be exerted at the flange intersection 116 between the first case section 112 and the second case section 114 held together by bolt/nut mechanism 206. In various embodiments, as illustrated in FIG. 3B, as the imbalance continues the first force $F_1$ and the second force $F_2$ may cause the flange on the first case section 112 to separate from the flange on the second case section 114 thereby creating a local bending moment on the bolt/nut mechanism 206. In various embodiments, as illustrated in FIG. 3C, as the imbalance further continues the first force $F_1$ and the second force $F_2$ may cause the flange on the first case section 112 to separate further from the flange on the second case section 114 thereby creating an even further local bending moment on the bolt/nut mechanism 206, which may eventually cause a failure in the bolt/nut mechanism 206.

Figure 4:
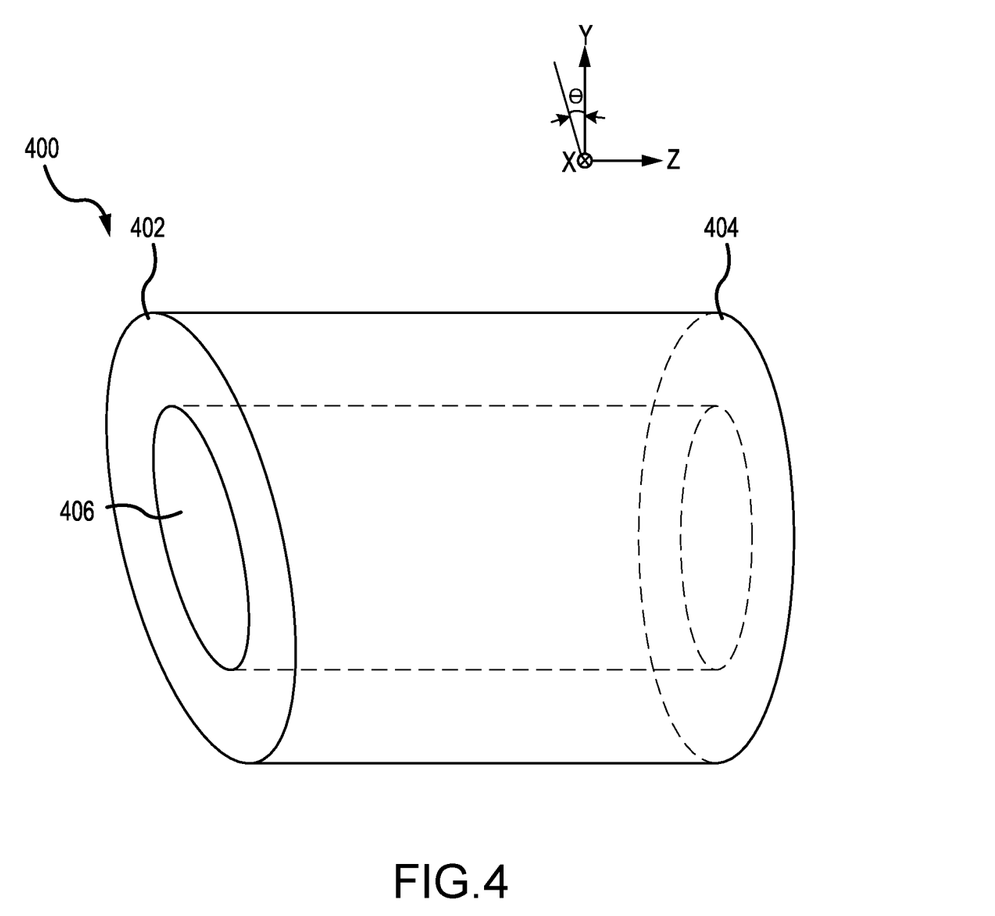
FIG. 4 illustrates a schematic view of an asymmetric spacer utilized to improve flange strength between components of a gas turbine engine, in accordance with various embodiments.

Referring now to FIG. 4, a schematic view of an asymmetric spacer 400 utilized to improve flange strength between components of a gas turbine engine is illustrated, in accordance with various embodiments. In various embodiments, a first end 402 of the asymmetric spacer 400 is configured to have a first slope in a y-direction as compared to a second slope of a second end 404 of the asymmetric spacer 400. In that regard, the first slope of the first end 402 of the asymmetric spacer 400 may be a non-vertical slope at an angle Θ from the y-axis. In various embodiments, the angle Θ may be between 0.2 and 5 degrees. In various embodiments, the angle Θ may be between 0.5 and 4 degrees. In various embodiments, the angle Θ may be between 1 and 3 degrees. In various, the second slope of the second end 404 may be a vertical slope. In various embodiments, the first slope may be formed through machining, grinding, or manufacturing, among other methods. In various embodiments, the first slope of the first end 402 the asymmetric spacer 400 is such that, once installed, the bolt passing through a void 406 of the asymmetric spacer 400 from the first end 402 to the second end 404 is configured to have an initial downward bend in the y-direction.

Figure 5A:
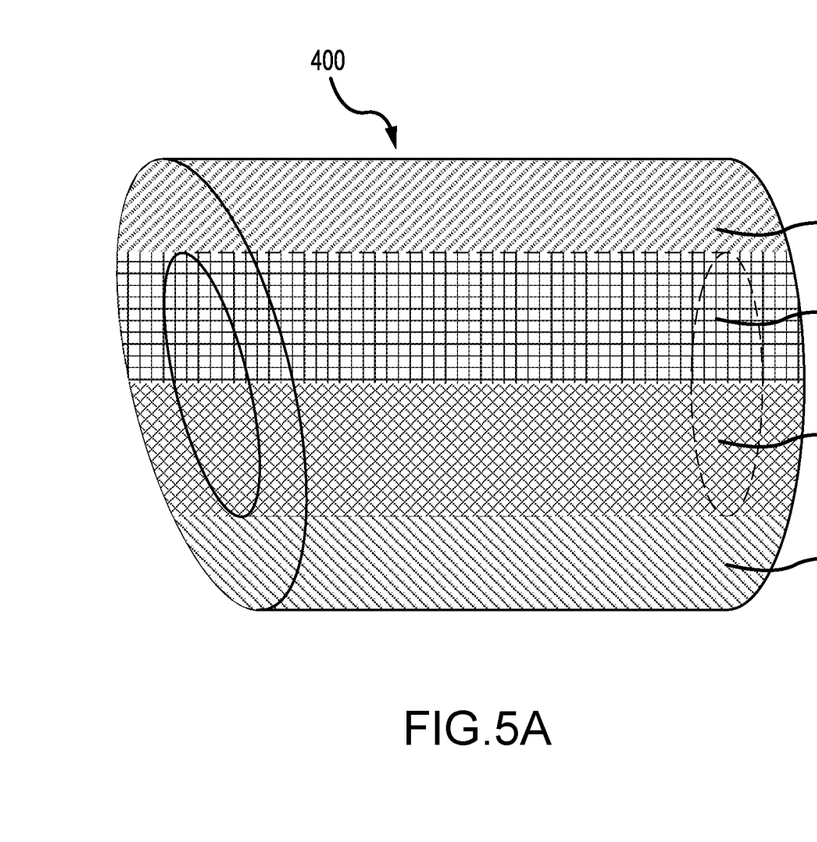
FIGS. 5A and 5B illustrate schematic views detailing various yielding portions within an asymmetric spacer, in accordance with various embodiments.
Figure 5B:
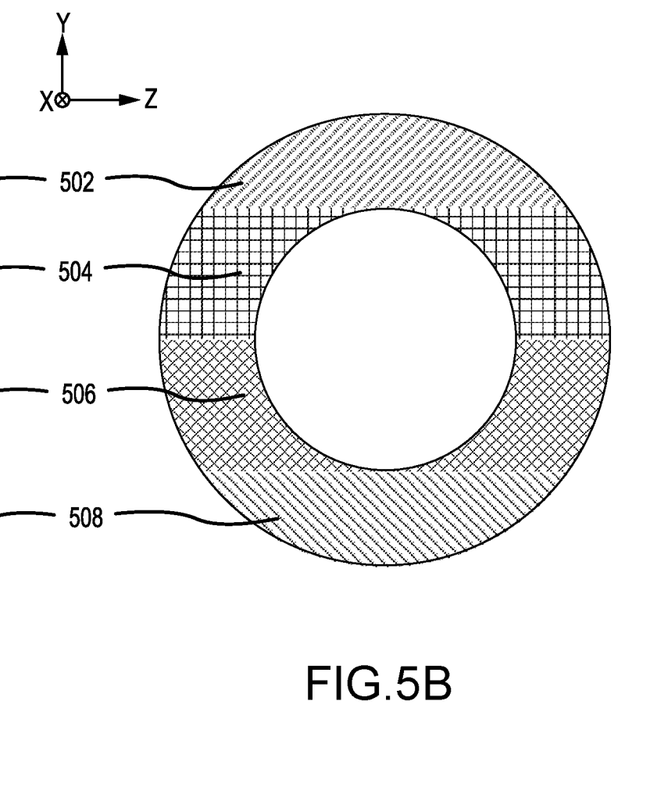

Referring now to FIGS. 5A and 5B, schematic views detailing various yielding portions within an asymmetric spacer 400 is illustrated, in accordance with various embodiments. In various embodiments, the asymmetric spacer 400 may be divided into quadrants along a width of the asymmetric spacer 400 having various material strengths, stiffnesses, or compliance, hereinafter referred to as material strengths. In various embodiments, the material strength of an upper portion of the asymmetric spacer 400, i.e. furthest away from a case section in a y-direction when installed, is rigid whereas a lower portion of the asymmetric spacer 400, i.e. closest to a case section in a y-direction when installed, is pliable. Accordingly, in various embodiments, quadrant 502 of the asymmetric spacer 400 may have a rigid material strength, quadrant 504 of the asymmetric spacer 400 may have a semi-rigid material strength, quadrant 506 of the asymmetric spacer 400 may have a semi-pliable material strength, and quadrant 508 of the asymmetric spacer 400 may have a pliable material strength. In various embodiments, the material strengths may be formed by heat treating, three-dimension printing, machining, drilling, or electrical discharge machining (EDM), among others. For example, with regard to heat treating, quadrant 502 of the asymmetric spacer 400 may be exposed to a heat treatment to harden quadrant 502 while quadrant 508 of the asymmetric spacer 400 may be annealed. As another example, a first set of holes may be drilled in quadrant 508, a second set of holes may be drilled in quadrant 506, where the second set of holes is less than the first set of holes, and a third set of holes may be drilled in quadrant 504, where the third set of holes is less than the first set of holes and less than the second set of holes. In various embodiments, the asymmetric spacer 400 may be manufactured from alloys of aluminum, nickel, titanium, or stainless steel, among other materials.

Figure 6:
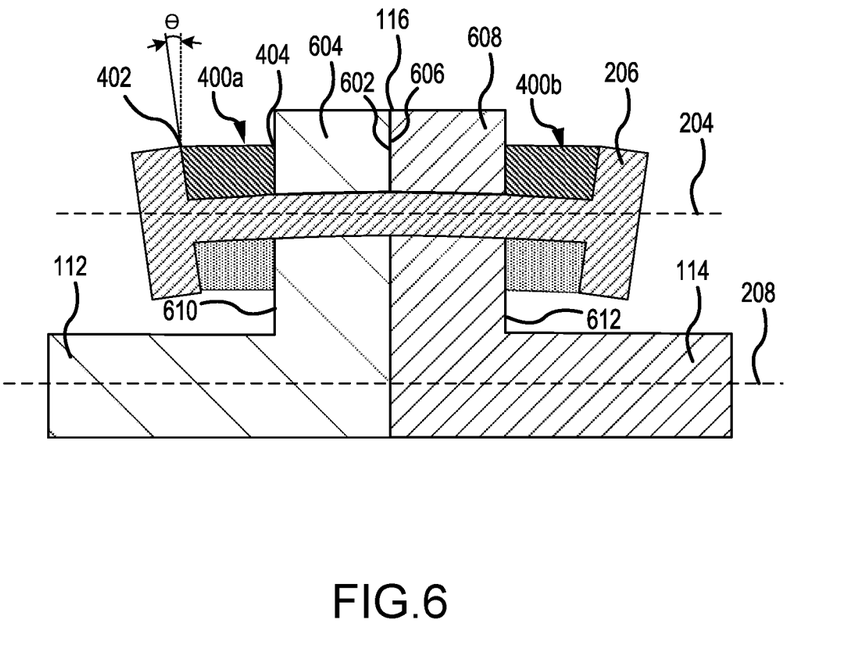
FIG. 6 illustrates a schematic view of asymmetric spacers installed on a bolted flange, in accordance with various embodiments.

Referring now to FIG. 6, a schematic view of asymmetric spacers 400 installed on a bolted flange is illustrated, in accordance with various embodiments. In various embodiments, an inside edge 602 of a first flange 604 of the first case section 112 abuts an inside edge 606 of a second flange 608 of the second case section 114 forming the flange intersection 116. In various embodiments, the first flange 604 and the second flange 608 each include a plurality of openings through which a plurality of bolt/nut mechanisms 206 are installed thereby forming a bolted flange. In various embodiments, an asymmetric spacer 400 is installed on either side of the flange such that the wider portion of the asymmetric spacer 400 is positioned at a farthest distance from the axial center 208 of the first case section 112 and the second case section 114 and the narrower portion of the asymmetric spacer 400 is positioned at a closest distance from the axial center 208 of the first case section 112 and the second case section 114. In that regard, the second end 404 of a first asymmetric spacer 400a abuts an outside edge 610 of the first flange 604 and the second end 404 of a second asymmetric spacer 400b abuts an outside edge 612 of the second flange 608 of the second case section 114.

In various embodiments, a bolt portion of the bolt/nut mechanisms 206 passes through a void, such as void 406 of FIG. 4, of the first asymmetric spacer 400a, a void in the first flange 604, a void in the second flange 608, and a void, such as void 406 of FIG. 4, in the second asymmetric spacer 400b. in various embodiments, once a nut portion of the bolt/nut mechanism 206 is coupled to the bolt portion of the bolt/nut mechanisms 206, the bolt/nut mechanism 206 is tightened to a predetermined torque thereby causing a prebend of the bolt portion of the bolt/nut mechanisms 206 away from a potential loading bend that may occur when a rotating imbalance event occurs within the gas turbine engine. In that regard, a center of the bolt portion of the bolt/nut mechanisms 206 remains at an axial center 204 of the bolt/nut mechanism 206 before tightening and ends of the bolt/nut mechanism 206 bend away from the axial center 204 of the bolt/nut mechanism 206 toward the axial center 208 of the first case section 112 and the second case section 114. In that regard, once installed and properly torqued, an inside edge of a head on the bolt/nut mechanism 206 and an inside edge of the nut of the bolt/nut mechanism 206 are at the angle Θ of the first end 402 of the asymmetric spacer 400.

Figure 7:
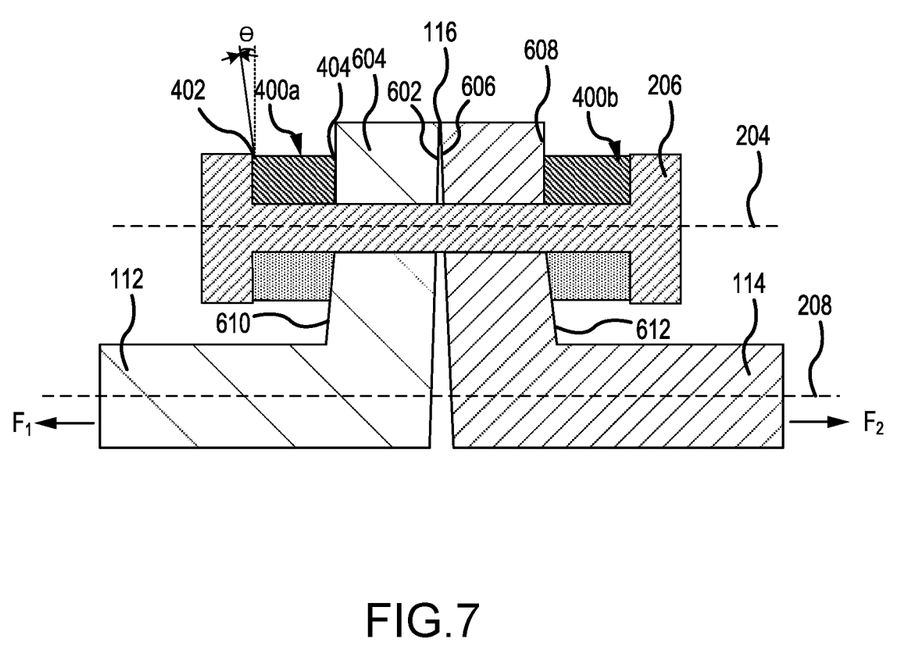
FIG. 7 illustrates a schematic view of the bolted flange utilizing asymmetric spacers and under an imbalanced load, in accordance with various embodiments.

Referring now to FIG. 7, a schematic view of the bolted flange utilizing asymmetric spacers and under an imbalanced load is illustrated, in accordance with various embodiments. FIG. 7 includes all the elements of FIG. 6 and, therefore, elements not described in FIG. 7 operate in a same manner as described in FIG. 6. In various embodiments, a rotating imbalance may occur within a gas turbine engine that may cause a first force $F_1$ and a second force $F_2$ opposite the first force $F_1$ to be exerted at the flange intersection 116 between the first case section 112 and the second case section 114 held together by bolt/nut mechanism 206. In various embodiments, as the imbalance continues the first force $F_1$ and the second force $F_2$ may cause the flange on the first case section 112 to separate from the flange on the second case section 114 thereby creating a local bending moment on the bolt/nut mechanism 206. In various embodiments, with loading due to the imbalance, the bolt of the bolt/nut mechanism 206 deforms through all or a portion of the non-vertical slope of the first end 402 of the asymmetric spacer 400. Accordingly, in various embodiments, the bolt portion of the bolt/nut mechanisms 206 bends in an opposite direction of the initial prebend minimizing any harmful effects of flange bending and enabling flange survival. In various embodiments, when the bolt of the bolt/nut mechanism 206 deforms due to the loading of the imbalance, the first end 402 of the asymmetric spacer 400 may also deform through all or a portion of the non-vertical slope of the first end 402 of the asymmetric spacer 400.

Figure 8A:
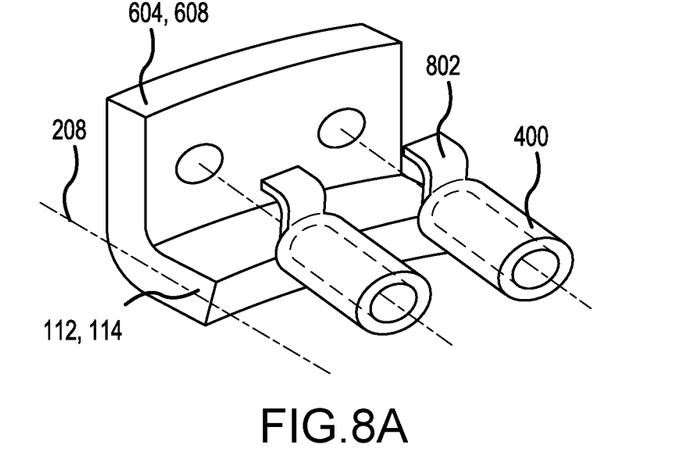
FIGS. 8A and 8B illustrate a schematic view of an asymmetric spacer alignment mechanism, in accordance with various embodiments.
Figure 8B:
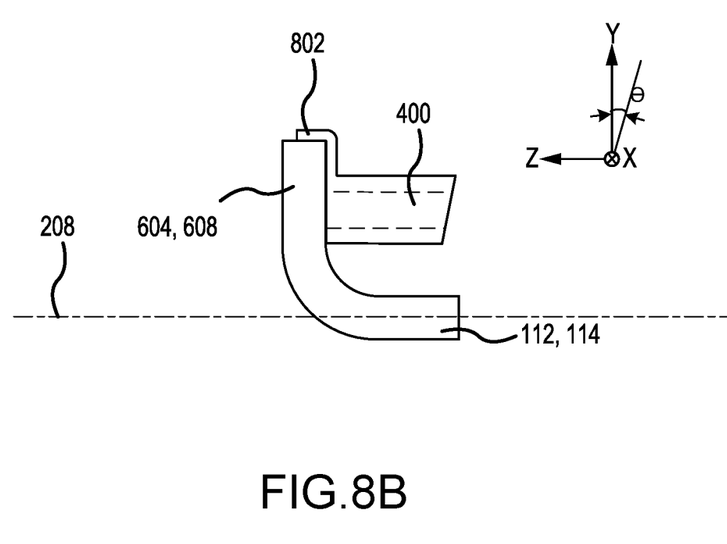

Referring now to FIGS. 8A and 8B, a schematic view of an asymmetric spacer alignment mechanism is illustrated, in accordance with various embodiments. In various embodiments, the asymmetric spacer 400 is installed on either side of the first flange 604 or the second flange 608 such that the wider portion of the asymmetric spacer 400 is positioned at a farthest distance from the axial center 208 of the first case section 112 and the second case section 114 and the narrower portion of the asymmetric spacer 400 is positioned at a closest distance from the axial center 208 of the first case section 112 and the second case section 114. In order to assure that the axial space is properly aligned, in various embodiments, a flange hook 802 is coupled to a center of the wider portion of the asymmetric spacer 400 and configured to have a vertical piece that extend in a y-direction up to a top edge of the first flange 604 or the second flange 608 and a horizontal piece that extends in a z-direction over the top edge of the first flange 604 or the second flange 608.

Figure 9:
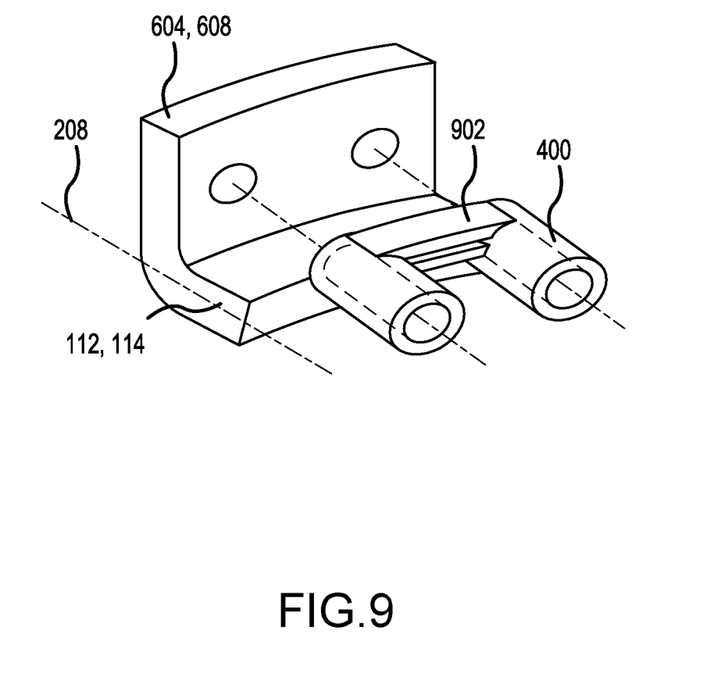
FIG. 9 illustrates a schematic view of an asymmetric spacer alignment mechanism, in accordance with various embodiments.

Referring now to FIG. 9, a schematic view of an asymmetric spacer alignment mechanism is illustrated, in accordance with various embodiments. In various embodiment, the asymmetric spacer 400 is installed on either side of the first flange 604 or the second flange 608 such that the wider portion of the asymmetric spacer 400 is positioned at a farthest distance from the axial center 208 of the first case section 112 and the second case section 114 and the narrower portion of the asymmetric spacer 400 is positioned at a closest distance from the axial center 208 of the first case section 112 and the second case section 114. In order to assure that the axial space is properly aligned, in various embodiments, two or more asymmetric spacers 400 are jointed together by a bridge 902 such that the center of the wider portion of the asymmetric spacers 400 are oriented toward a top edge of the first flange 604 or the second flange 608.

Thus, in various embodiments, the provided asymmetric spacer improves flange strength between components of gas turbine engines. In various embodiments, the asymmetric spacer is designed to minimize harmful effects of flange bending caused by a rotating imbalance within a gas turbine engine during, for example, fan blade loss, in which a rotating imbalance of a rotor generates engine backbone bending which challenges bolted joints at case flanges.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A mounting assembly for coupling a first case section of a gas turbine engine to a second case section of the gas turbine engine, the first case section and the second case section extending along an axial direction with respect to a central rotational axis of the gas turbine engine, comprising:
a first flange coupled to the first case section;
a second flange coupled to the second case section;
a first asymmetric spacer comprising a first end with a non-vertical slope, a second end with a vertical slope, and a void passing through a length of the first asymmetric spacer from the first end to the second end;
a second asymmetric spacer comprising a first end with a non-vertical slope, a second end with a vertical slope, and a void passing through a length of the second asymmetric spacer from the first end to the second end; and
a bolt configured to pass through the void of the first asymmetric spacer starting at the first end, through at least one first opening of the first flange, through at least one second opening of the second flange, through the void of the second asymmetric spacer starting at the second end, and to be coupled to a nut, such that, in response to the nut being fastened to the bolt, the bolt bends due to the non-vertical slope of the first asymmetric spacer and the non-vertical slope of the second asymmetric spacer, wherein, in response to the bolt and nut being tightened to a predetermined torque, a center of a bend of the bolt remains at an axial center of the bolt, wherein a first end of the bolt bends away from the axial center of the bolt toward the axial center of the first case section, and wherein a second end of the bolt bends away from the axial center of the bolt toward the axial center of the second case section.

2. The mounting assembly of claim 1, wherein a longest length of the first asymmetric spacer is configured to be oriented at a furthest distance from a first axial center of the first case section, and wherein a longest length of the second asymmetric spacer is configured to be oriented at a furthest distance from a second axial center of the second case section.

3. The mounting assembly of claim 1, wherein the non-vertical slope of the first end of the first asymmetric spacer with respect to the second end of the first asymmetric spacer and the first end of the second asymmetric spacer with respect to the second end of the second asymmetric spacer is between 0.2 and 5 degrees.

4. The mounting assembly of claim 1, wherein the first asymmetric spacer and the second asymmetric spacer are divided into quadrants along a width of the first asymmetric spacer and the second asymmetric spacer and wherein each of the quadrants have a different material strengths.

5. The mounting assembly of claim 4, wherein a first material strength of a first quadrant along a longest length of the first asymmetric spacer and the second asymmetric spacer has greater rigidity than a second material strength of a second quadrant adjacent to the first quadrant, wherein the second material strength has greater rigidity than a third material strength of a third quadrant adjacent to the second quadrant, and wherein the third material strength has greater rigidity than a fourth material strength of a fourth quadrant adjacent to the third quadrant.

6. The mounting assembly of claim 4, wherein the different material strengths are formed by at least one of heat treating, three-dimension printing, machining, drilling, or electrical discharge machining (EDM).

7. The mounting assembly of claim 1, wherein the first asymmetric spacer comprises a first flange hook configured to hook to an outer edge of the first flange thereby aligning a longest length of the first asymmetric spacer at a furthest distance from a first axial center of the first case section, and wherein the second asymmetric spacer comprises a second flange hook configured to hook to an outer edge of the second flange thereby aligning a longest length of the second asymmetric spacer at a furthest distance from a second axial center of the second case section.

8. The mounting assembly of claim 1, wherein the first asymmetric spacer comprises a first bridge mechanism coupled to a first adjacent asymmetric spacer, wherein the first bridge mechanism is configured to align a longest length of the first asymmetric spacer at a furthest distance from a first axial center of the first case section, and wherein the second asymmetric spacer comprises a second bridge mechanism coupled to a second adjacent asymmetric spacer, wherein the second bridge mechanism is configured to align a longest length of the second asymmetric spacer at a furthest distance from a second axial center of the second case section.

9. The mounting assembly of claim 1, wherein the first asymmetric spacer and the second asymmetric spacer are manufactured from alloys of aluminum, nickel, titanium, or stainless steel.

10. A gas turbine engine, comprising:
a first asymmetric spacer comprising a first end with a non-vertical slope, a second end with a vertical slope, and a void passing through a length of the first asymmetric spacer from the first end to the second end;
a second asymmetric spacer comprising a first end with a non-vertical slope, a second end with a vertical slope, and a void passing through a length of the second asymmetric spacer from the first end to the second end; and
a bolt configured to pass through the void of the first asymmetric spacer starting at the first end, through at least one first opening of a first flange, through at least one second opening of a second flange, through the void of the second asymmetric spacer starting at the second end, and to be coupled to a nut, such that, in response to the nut being fastened to the bolt, the bolt bends due to the non-vertical slope of the first asymmetric spacer and the non-vertical slope of the second asymmetric spacer, wherein, in response to the bolt and nut being tightened to a predetermined torque, a center of a bend of the bolt remains at an axial center of the bolt, wherein a first end of the bolt bends away from the axial center of the bolt toward the axial center of first case section of the gas turbine engine, and wherein a second end of the bolt bends away from the axial center of the bolt toward the axial center of second case section of the gas turbine engine.

11. The gas turbine engine of claim 10, wherein the first flange is coupled to the first case section, wherein the second flange is coupled to the second case section, wherein a longest length of the first asymmetric spacer is configured to be oriented at a furthest distance from a first axial center of the first case section, and wherein a longest length of the second asymmetric spacer is configured to be oriented at a furthest distance from a second axial center of the second case section.

12. The gas turbine engine of claim 10, wherein the non-vertical slope of the first end of the first asymmetric spacer with respect to the second end of the first asymmetric spacer and the first end of the second asymmetric spacer with respect to the second end of the second asymmetric spacer is between 0.2 and 5 degrees.

13. The gas turbine engine of claim 10, wherein the first asymmetric spacer and the second asymmetric spacer are divided into quadrants along a width of the first asymmetric spacer and the second asymmetric spacer and wherein each of the quadrants have different material strengths.

14. The gas turbine engine of claim 13, wherein a first material strength of a first quadrant along a longest length of the first asymmetric spacer and the second asymmetric spacer has greater rigidity than a second material strength of a second quadrant adjacent to the first quadrant, wherein the second material strength has greater rigidity than a third material strength of a third quadrant adjacent to the second quadrant, and wherein the third material strength has greater rigidity than a fourth material strength of a fourth quadrant adjacent to the third quadrant.

15. The gas turbine engine of claim 13, wherein the different material strengths are formed by at least one of heat treating, three-dimension printing, machining, drilling, or electrical discharge machining (EDM).

16. The gas turbine engine of claim 10, wherein the first asymmetric spacer comprises a first flange hook configured to hook to an outer edge of the first flange thereby aligning a longest length of the first asymmetric spacer at a furthest distance from a first axial center of the first case section, and wherein the second asymmetric spacer comprises a second flange hook configured to hook to an outer edge of the second flange thereby aligning a longest length of the second asymmetric spacer at a furthest distance from a second axial center of the second case section.

17. The gas turbine engine of claim 10, wherein the first asymmetric spacer comprises a first bridge mechanism coupled to a first adjacent asymmetric spacer, wherein the first bridge mechanism is configured to align a longest length of the first asymmetric spacer at a furthest distance from a first axial center of the first case section, and wherein the second asymmetric spacer comprises a second bridge mechanism coupled to a second adjacent asymmetric spacer, wherein the second bridge mechanism is configured to align a longest length of the second asymmetric spacer at a furthest distance from a second axial center of the second case section.

18. The gas turbine engine of claim 10, wherein the first asymmetric spacer and the second asymmetric spacer are manufactured from alloys of aluminum, nickel, titanium, or stainless steel.

\* \* \* \* \*

UNITED STATES PATENT AND TRADEMARK OFFICE
CERTIFICATE OF CORRECTION

| | |
|---|---|
| PATENT NO. | : 11,920,492 B1 |
| APPLICATION NO. | : 18/123877 |
| DATED | : March 5, 2024 |
| INVENTOR(S) | : Jason B. Husband et al. |

It is certified that error appears in the above-identified patent and that said Letters Patent is hereby corrected as shown below:

In the Claims

Claim 10, at Column 10, Line 66 -prior to the word "first" please insert --a--
Claim 10, at Column 11, Line 2 -prior to the word "second" please insert --a--

Signed and Sealed this
Eighteenth Day of June, 2024

Katherine Kelly Vidal
*Director of the United States Patent and Trademark Office*